L. YALE, Jr.
Adjustable Square.
No. 21,861.
Patented Oct. 19, 1858.
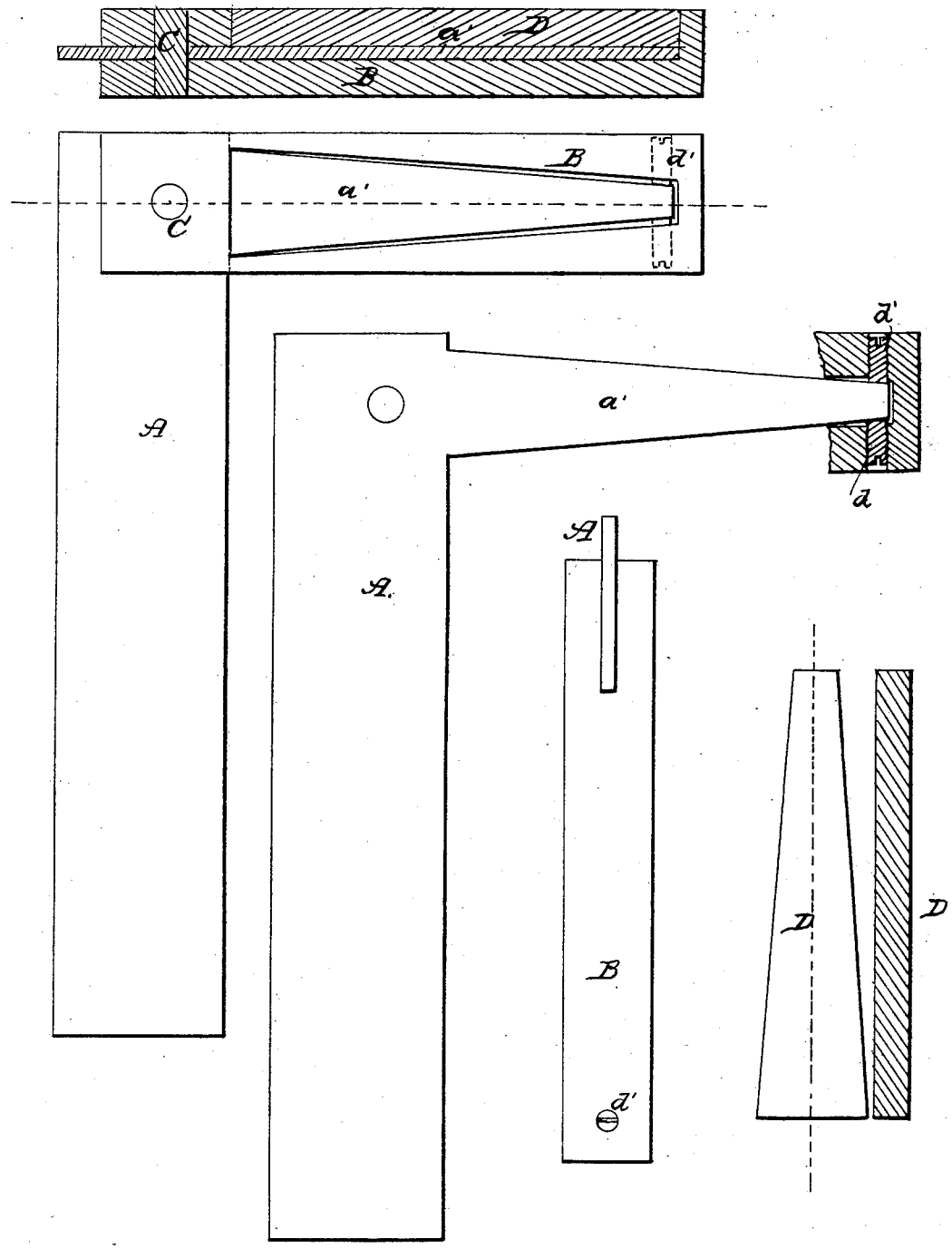

UNITED STATES PATENT OFFICE.

LINUS YALE, JR., OF PHILADELPHIA, PENNSYLVANIA.

DEVICE FOR ADJUSTING TO A RIGHT ANGLE JOINERS' SQUARES.

Specification of Letters Patent No. 21,861, dated October 19, 1858.

*To all whom it may concern:*

Be it known that I, LINUS YALE, Jr., of Philadelphia, in the county of Philadelphia, in the State of Pennsylvania, have invented a new and Improved Method of Constructing Squares; and I do hereby declare the following to be a full and exact description of the same, reference being had to the drawings hereunto annexed and the letters of reference marked thereon.

The nature of my invention consists in providing the blade of the square with a lateral projection or arm proportioned to its length to serve as a lever by which through two screws at its extreme end the blade may be made readily to assume a position exactly at right angles to the handle.

To enable others skilled in the manufacture to construct my improved square I proceed to describe its construction as follows, viz.

The blade A is made with a lateral projection or arm $a$ which occupies the recessed chamber of the handle or stock B, which recess is made just deep enough to be on a line with the jaw or mortise which as usual is made in the end of the handle to receive the blade, said arm being slightly less in width than the recess, to allow of a little movement within it. Through the end of the handle and about central with both the blade and handle is inserted a tightly fitting bolt or rivet pin C, on which the blade may slightly vibrate as hereinafter more fully described. Through the handle B, at the extreme end of the arm $a'$ of the blade A and against its edges are inserted two finely threaded screws $d$, $d'$ by which the movement of the blade is effected or its position established and retained. The chamber or recess in the handle is neatly fitted with a cover D, which completes the instrument.

In manufacturing the principal requisites are first to make the edges of the blade parallel as also the sides of the handle—and then to have the rivet through them perfectly fill the hole. There needs no nicety of adjustment of the angle while putting together, requiring the tenderness of soft solder or the extremely difficult and well nigh impossible fastening to its proper position by a number of rivets. Either of which modes are so unsatisfactory from the fact that when they are disturbed by accident they require the same difficult work to be done over again. In this my improvement the integrity of the angle is established after finishing and even after purchase by any ordinary workman and of course can at any time be readjusted in a few moments after being disturbed purposely or by accident.

I do not claim making the angle of a square adjustable as that has been frequently done before; but I do claim, and desire to secure by Letters Patent—

Extending an arm $a'$ or its equivalent (to act as a lever) along the handle or stock far enough to insure the proper effect of the adjusting screws or their equivalents for the purpose and substantially as described.

LINUS YALE, JR.

Witnesses:
RICHD. PAXSON,
JOHN HOSKIN.